June 4, 1968  J. F. D. BRUINSMA  3,386,628
DEVICE FOR DISCHARGING A POWDERED MATERIAL FROM A CONTAINER
Filed Dec. 27, 1966  2 Sheets-Sheet 1

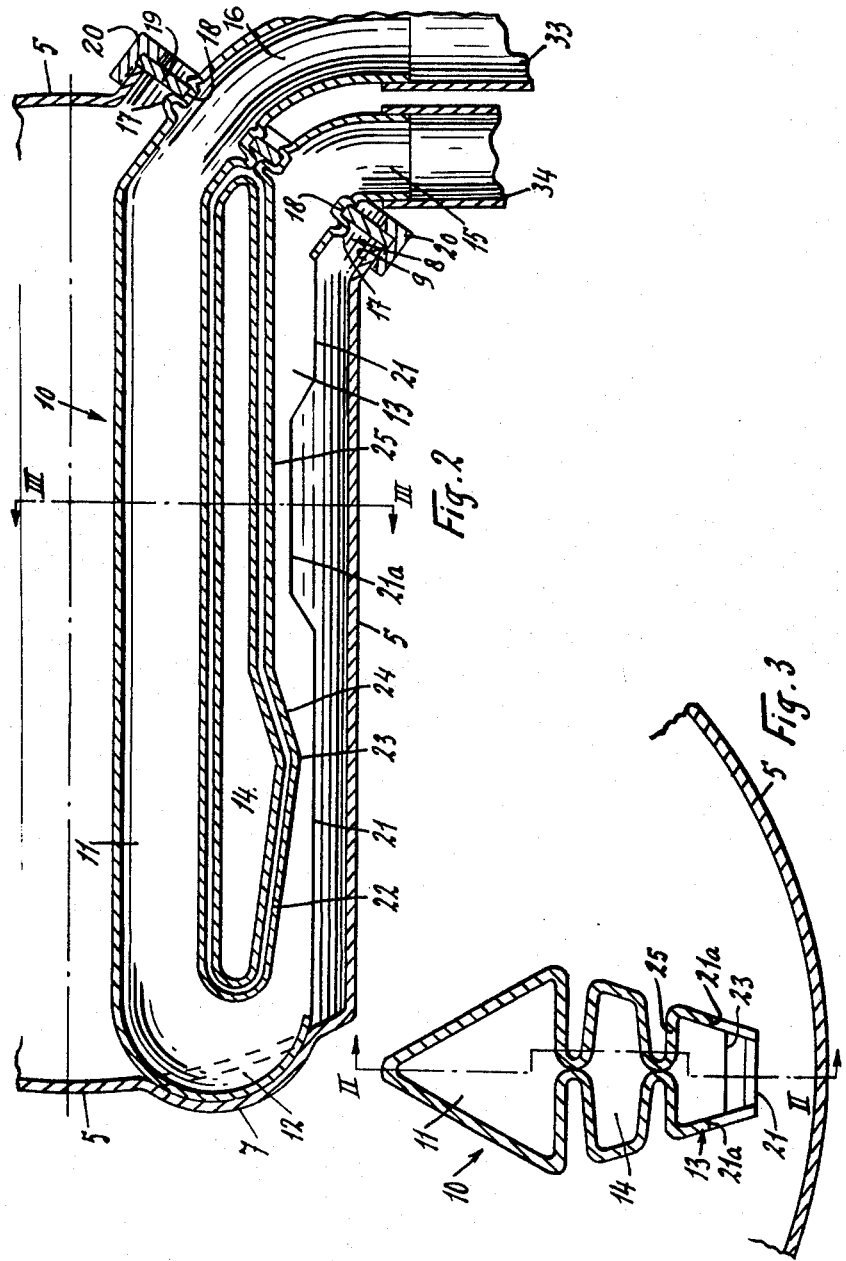

3,386,628
DEVICE FOR DISCHARGING A POWDERED
MATERIAL FROM A CONTAINER
Josephus Fredericus Dominicus Bruinsma, Dodewaard,
Netherlands, assignor to Kiekens Wervelwind Holland
N.V., Wadenoyen, Netherlands, a Dutch company
Filed Dec. 27, 1966, Ser. No. 604,970
Claims priority, application Netherlands, Dec. 28, 1965,
65—16,990
8 Claims. (Cl. 222—193)

ABSTRACT OF THE DISCLOSURE

A device for discharging a powder from a container, comprising a channel member mounted longitudinally inside the container close to the bottom thereof and having a longitudinal slot at its lower side. The channel is connected at one end to a source of gas pressure and at its other side to a powder discharge conduit whereby a flow of carrier gas for the powder is passed through the channel. Near its gas inlet end the channel has a portion of first decreasing and then increasing cross-section followed by a second portion in which the slot has a greater width than in the first channel portion.

---

The invention generally relates to a device for discharging a powdered material from a container and more in particular to such a device for use in a powder spraying apparatus for agricultural purposes in which a substance in powder form for combatting plant diseases or the like is discharged from a suitable powder container of the apparatus by a flow of carrier air and led to a powder spraying nozzle.

It has been suggested to discharge a powder-filled container by means of a tube member arranged horizontally on the bottom of the container and connected to the suction side of a blower for passing a flow of air therethrough, which tube member has openings in its side walls. The air flow through the tube may thus carry along by suction the powder entering the tube through the openings in the side walls thereof. It has appeared in practice, however, that devices of this type do not operate satisfactorily under all circumstances and that it is difficult to completely empty a container of elongated form in this way. It has further appeared that the powdered material tends to form bridges between the upper edges of the tube openings and the container bottom and that the relatively low velocity of the air flow in the pockets underneath these bridges is generally unsufficient to dislodge and carry off the powder material of these bridges. The use of transverse baffle plates in the tube passage for creating local whirling movements in the air flow cannot sufficient prevent this bridge forming of the powder and has the disadvantage of increasing the flow resistance. Another disadvantage of these known devices is that they cause to some extent a separation of the lighter and heavier powder particles which is undesirable especially in the case of a composite powder.

The invention has for its object to obviate these disadvantages and to provide a device of the kind described capable of completely emptying a powder-filled container without separation of the lighter and heavier powder components.

Another object of the invention is to provide a device of the kind described which is especially adapted for use in the container of a powder spraying apparatus for agricultural purposes.

A further object of the invention is to provide a powder spraying apparatus having a powder container and a device for discharging the powder therefrom in which said discharging device is light in weight, simple of construction and easily removable and exchangeable.

According to the invention, the device of the kind as above indicated comprises a channel member extending substantially horizontally inside the container close to the bottom thereof and adapted for connection to a blower means, which channel member is open on its bottom side and encloses between the lower edges of its side walls a slotlike opening extending substantially in parallel to and at a short distance above the container bottom. The channel member further comprises, adjacent its gas inlet side, a first portion of first gradually decreasing and then increasing cross-sectional area followed by a second channel portion in which the slotlike opening has a greater width and preferably is situated at a greater distance above the container bottom than the opening in said first channel portion.

In the operation of the device, the gas flow or air passing through the channel member is accelerated at the location of the narrowing channel passage whereby the air tends to leave the channel slot and spread out across the bottom of the container, after which the air flow, carrying along the powder it has dislodged at the container bottom, returns to the channel through the wider opening in said second channel portion. In this way, bridge forming of the powder material between the edges of the channel opening and the container bottom is effectively prevented and the container can be substantially completely emptied, the discharge process gradually proceeding downstream along the channel member from the air inlet end to the air outlet end thereof. It has, furthermore, appeared that by employing a sufficiently powerful gas flow, separation of the powdered material can be substantially prevented so that powder mixtures of fine granular and coarse granular substances can be effective discharge from the container.

According to a preferred embodiment, the decrease of the cross-sectional area in the first channel portion may be obtained in that the upper wall of this channel portion gradually slopes downwardly in the direction of the gas flow following which this upper wall again slopes upwardly. In the said second channel portion the side walls of the channel member may be partly cut away at their lower edges so as to obtain a wider entrance for this channel portion. Preferably, the side walls of the channel member are inwardly and downwardly inclined whereby at these cut-away parts of the side walls not only is the height of the channel opening above the container bottom increased, but at the same time a greater width of this opening is obtained.

The device according to the invention can be used for emptying containers of many kinds and types, e.g. silos and the like. However, the device is especially adapted for use in a container for a powder spraying apparatus for agricultural purposes in which case the channel member may be connected to the pressure side of the blower of the apparatus and the powder carried along by the air flow through the container may be carried by this air flow to a suitable spraying nozzle communicating with the outlet end of the channel member. In spraying apparatus of this kind it may be desirable to be able to use the same for spraying either a liquid or a powdery material, depending on the prevailing circumstances. In that case, and especially if the apparatus is of the portable type and for this reason should be as light in weight and as simple in construction as possible, it is often desirable that the same container can be used for holding a liquid as well as a powder and need not be exchanged. This means, however, that the device for discharging a powder from the container should be easily removable therefrom in order that the container may be also used and connected in the conventional way for operation of the spraying apparatus for spraying a liquid.

To allow such easy removal of the powder discharge device from the container, according to a preferred embodiment of the invention, the channel member at its upstream end is connected by means of a bend portion to a conduit means extending above the channel member and forming an integral part therewith, which channel member and conduit means at their ends opposite of said bend portion have adjacent connecting tube portions and together from an exchangeable insert unit which may be inserted into the container through a suitable opening in the wall thereof with said tube portions being adapted to be sealingly mounted in this opening.

The invention and its advantages will appear more fully from the following description in conjunction with the drawings showing an embodiment of the invention as applied to a portable spraying apparatus for agricultural purposes.

FIGURE 2 is a section view on enlarged scale taken on lines II—II of FIGURE 3, of the lower part of the container with the powder discharge means mounted therein; and FIGURE 3 is a cross-section view of the lower part of the container taken on the lines III—III of FIGURE 2.

Figure 1:
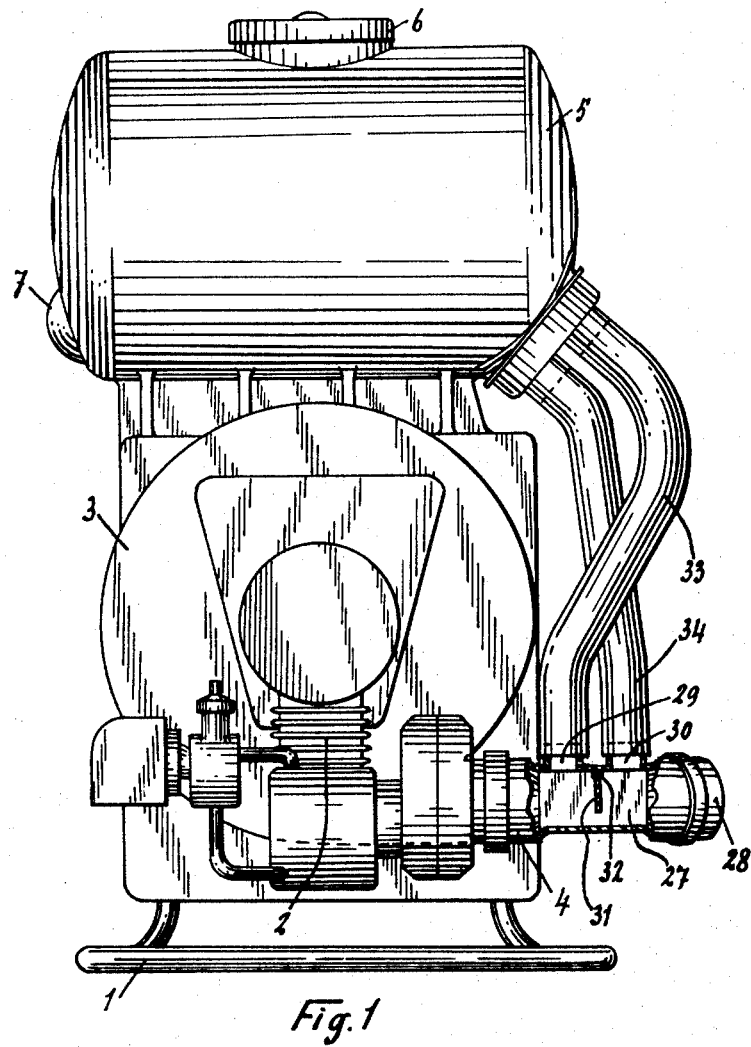
FIGURE 1 is a rear view of the apparatus with the container for the material to be sprayed mounted thereon.

In the drawing only those parts of the apparatus are shown and described as are necessary for a proper understanding of the invention.

The spraying apparatus shown in FIGURE 1 comprises a tube frame 1 having a base portion and two parallel upstanding tube parts on which a blower unit is mounted consisting of a single-cylinder combustion motor 2 and a centrifugal blower 3 driven by this motor and comprising an outlet 4. The frame 1 carries at its upper end above the blower unit a substantially cylindrical container 5 having at its upper side a filling opening closed by a removable cap 6. The frame is provided with suitable straps or the like (not shown) by means of which the operator can carry the spraying apparatus on his back. The general arrangement of the parts of the portable spraying apparatus are as such well-known in that art and are, therefore, not described and shown in detail.

As also shown in FIGURE 2, the container 5 has in its left-hand end wall an outward bend portion 7 forming a rounded recess in this end wall as seen from the inside of the container which recess is situated at a small distance above the lower part or bottom of the cylindrical container side wall. The right-hand end wall of the container has opposite this recess 7 a circular opening 8 having a downwardly inclined axis and a cylindrical rim portion 9 which is threaded on its outer side.

An elongated insert unit 10 is removably mounted in the container and extends in the axial direction of the container through the lower part thereof. The unit has been inserted into the container through the opening 8. The insert unit comprises an upper conduit portion 11 of triangular cross-sectional shape, a lower bottomless channel member 13 and a bend portion 12 connecting the corresponding ends of the conduit portion 11 and the channel member 13. The channel member 13 has a trapezium-shaped cross-section with downwardly inclined converging side walls terminating, as shown, with their lower edges at a small distance above the container bottom. The insert unit 10 is formed as a single integral part of a suitable thermoplastic material. The unit 10 may be made from a length of plastic tubing which is placed in a suitable die and in a well-known manner is blown into conformity with the inner die walls. In order to form the lower wall of the upper conduit portion 11 and the upper wall of the channel member 13, the opposed side walls of the tubing are pressed inwardly until they contact one another whereby the cross-sectional shape of the insert unit shown in FIGURE 3 is obtained. Between the parts 11 and 13 a hollow connecting portion 14 is thus formed which serves for stiffening the unit structure but has no further function.

At the end of the insert unit 10 opposite of the bend portion 12 the channel member 13 and conduit portion 11 each extend into a separate, downwardly bent connecting tube portion 15 and 16, respectively. At the junction of each of the portions 11 and 13 with the associated tube portions 15 and 16, respectively, an annular flange-like rim 17 with adjacent annular groove 18 is formed in the outer tube wall. A closure plate 19 is fixedly mounted on the tube portions 15 an 16 which plate has two circular holes, the edges of which engage in the grooves 18 of the two tube portions 15 and 16 in a manner as shown in FIGURE 2.

The closure plate 19 has the same outer diameter as the rim portion 9 of the container opening 8 and is clampingly held against this rim portion by means of a threaded sleeve 20 of angular cross-sectional shape screw onto the rim portion 9 and with its inwardly projecting annular flange portion engaging the outer face of the closure plate 19. If desired, a sealing ring (not shown) can be placed between the end face of the rim portion 9 and the closure plate 19. In this position of the insert unit 10, the bend portion 12 thereof clampingly engages in the recess 7 of the container wall whereby the insert unit is immovably held in its proper position in the container 5.

After forming the insert unit 10 from a length of tubing in the manner as above described, the lower wall of the channel member 13 is cut away whereby a slot-like opening is formed between the lower edges of the channel side walls, which opening extends longitudinally of the container close to the bottom thereof. Starting at the bend 12, the upper wall of the channel member 13 has a downwardly inclined portion 22 reaching its lowest point at 23 where it joins a short upwardly inclined upper wall portion 24 leading to a straight upper wall portion 25 which extends parallel to the container bottom over the remaining length of the channel member.

To the rear of the upper wall portion 24 the side walls of the channel member are cut away over part of their length and height as shown at 21a whereby at this location the opening between the lower edges of the side walls is situated at a greater distance from the container bottom and, because of the inward slope of the side walls, this portion 21a of the opening also has a greater width than the opening portions 21 on both sides thereof.

The blower outlet 4 is connected through a rigid pipe 27 and a flexible hose 28 to a conventional spraying nozzle (not shown) which the operator carrying the apparatus on his back may hold in his hand. The pipe 27 has intermediate its ends a portion of rectangular cross-section having in its upper wall two circular openings fitted with upwardly projecting connecting sleeves 29 and 30 arranged one closely adjacent the other in the axial direction of the pipe 27. A valve flap 31 is hingedly mounted on the inner wall of the pipe 27 between said two openings therein, the flap being secured to a hinge pin 32 which extends outwardly through the wall of the pipe and is provided with a suitable handle (not shown) for the manual adjustment of the flap. In its transverse position as shown in FIGURE 1, the valve flap 31 extends across the tube 27 a short distance past the axis thereof. From this position the valve flap 31 may be rotated by hand through an angle of 90° in the clockwise direction to a position in which the flap closes the opening of the sleeve 29.

The sleeve 29 is connected by a first flexible tube 33 to the tube portion 16 leading to the conduit portion 11 of the insert unit 10 and the sleeve 30 is connected by a second flexible tube 34 to the tube portion 15 coming from the channel member 13.

When the spraying apparatus is to be used for spraying a powdered material, the insert unit 10 is mounted in the container 5 and connected to the blower outlet pipe 27 in the manner as above described whereupon the container is filled with the powder to be sprayed. On starting the motor 2, the blower 3 driven by this motor causes air to flow through the pipe 27 and the flexible hose 28 to the spraying nozzle at the end of this hose. When the air flap 31 is in its position closing the opening of the sleeve 29, no air will enter the tube 33 leading to the container 5. However, when the air flap 31 is moved to its transverse position shown in FIGURE 1, the air flap causes a pressure difference to occur at the openings of the sleeves 29 and 30, respectively, whereby air is caused to flow from the pipe 27 through the tube 33, the conduit portion 11 of the insert unit 10, the bend portion 12, the channel member 13, the tube 34 and back to the pipe 27 through the opening of the sleeve 30 downstream of the valve flap 31. By adjustment of this valve flap the air flow thus passing through the container 5 and branched off from the main flow of air through the pipe 27 can be regulated.

The air flowing through the channel member 13 moves along the powder exposed at the slotlike channel opening 21, 21a, carrying with it powder particles dislodged from this powder surface through the tube 34 to the pipe 27 and from there to the spraying nozzle. As a result of the downwardly inclined upper wall portion 22 of the channel and the restricted channel passage at 23, the air flow is accelerated and tends to leave the channel opening 21 to spread out across the container bottom. If at the upstream end of the channel the powder tends to form bridges between the channel side walls and the bottom of the container 5, these bridges are effectively attacked and undermined by this accelerated and whirling air flow leaving the channel opening whereby such bridges are soon caused to collapse. This air flowing along the container bottom returns to the channel further downstream through the wider and higher opening portion 21a while carrying along the loosened powder particles. In this way, the container is gradually emptied from the channel upstream side to the downstream side thereof in which no harmful separation of the lighter and heavier particles of the powder occurs. At the end of the discharging operation only a negligible amount of powder remains in the container since the channel opening is situated close to the container bottom and also the powder at the downstream side of the container is finally dislodged by the turbulence of the air flow and carried off.

If the same spraying apparatus is to be used for spraying a liquid, the insert unit 10 can be easily removed from the container, by unscrewing the sleeve 20, and replaced by a suitable connection for feeding liquid from the container to the spraying nozzle.

Although the invention has been described with reference to the embodiment shown in the drawings, other embodiments may be resorted to within the scope of the following claims.

What is claimed:

1. The combination of a container for holding a powdered material and a device for discharging such material from said container, comprising an elongated channel member mounted substantially horizontally inside said container close to the bottom thereof, said channel member having an upper wall, two opposed side walls extending downwardly from said upper wall and enclosing between the lower edges of the side walls a slotlike opening extending longitudinally of the channel member and spaced from the container bottom, a gas inlet end and a gas outlet end, and connecting means at each of said channel member ends passing outwards through a wall of said container and adapted to be connected to a source of gas pressure and to a discharge conduit means, respectively, so as to pass a flow of gas through said channel member from said inlet end to said outlet end thereof for carrying along powder material from the container entering the channel member through said opening, said channel member further having adjacent said inlet end a first portion of first gradually decreasing and then increasing cross-sectional area followed by a second channel portion in which said slotlike opening has a greater width than in said first channel portion.

2. The combination of claim 1 in which the upper wall of the channel member in said first channel portion first gradually slopes downwardly in the direction of the gas flow and then slopes upwardly again.

3. The combination of claim 1 in which the side walls of the channel member in said second channel portion are partly cut away at their lower edges.

4. The combination of claim 3 in which the side walls of the channel member are inwardly and downwardly inclined.

5. The combination of claim 1 in which said connecting means at said inlet end of the channel member comprises a conduit means extending in parallel with and above said channel member and attached to said member, a bend portion connecting said channel inlet end to the corresponding end of said conduit portion, and a first tube portion formed at the end of said conduit portion opposite said bend portion, and in which said connecting means at said outlet end of the channel member comprises a second tube portion, said two tube portions being arranged one closely adjacent the other, said container having an opening in its wall closely adjacent the container bottom through which the combined channel member and conduit member may be inserted into the container, and means on said two tube portions for removably and sealingly mounting said tube portions in said container opening with the free ends of said tube portions projecting outside of said container.

6. The combination of claim 5 in which said mounting means comprises a closure plate for said container opening having two holes therein, said tube portions passing through said closure plate holes and being fixedly secured therein.

7. The combination of claim 5 in which the container wall opposite said opening has a recess formed therein, said bend portion fittingly engaging in said recess in the mounted position of the combined channel member and conduit means in said container.

8. A powder spraying apparatus, comprising a container for holding a powdery material, an elongated channel member mounted substantially horizontally inside said container close to the bottom thereof, said channel member having an upper wall, two opposed side walls extending downwardly from said upper wall and enclosing between the lower edges of the side walls a slotlike opening extending longitudinally of the channel member and spaced from the container bottom, a gas inlet end and a gas outlet end, said channel member further having adjacent said inlet end a first portion of first gradually decreasing and then increasing cross-sectional area followed by a second channel portion in which said slotlike opening has a greater width than in said first channel portion, connecting means at each of said channel member ends passing outwards through a wall of said container, a blower, driving means for said blower, a main conduit means connected to the pressure side of said blower for the discharge of powder spray, said main conduit means having a wall with two side openings arranged closely adjacent one another in the axial direction of said conduit means, first and second tube means connecting said two connecting means at the inlet end and outlet end, respectively, of said channel member with the upstream opening and downstream opening, respectively, of said two openings in said main conduit means, a valve flap hingedly mounted on the inner wall of said main conduit means between said two openings, said valve flap having a smaller surface area than the cross-sectional area of said main conduit means, and means for manually adjusting said valve flap between a position transverse of said main conduit means and a position in which said valve flap closes said upstream opening of said two openings.

References Cited

UNITED STATES PATENTS 2,950,564   8/1960   Bonine _____ 222—193
3,054,210   9/1962   Kratzer et al. _____ 239—654

STANLEY H. TOLLBERG, *Primary Examiner.*